No. 892,694. PATENTED JULY 7, 1908.
G. A. STILES.
THILL COUPLING.
APPLICATION FILED JAN. 20, 1908.
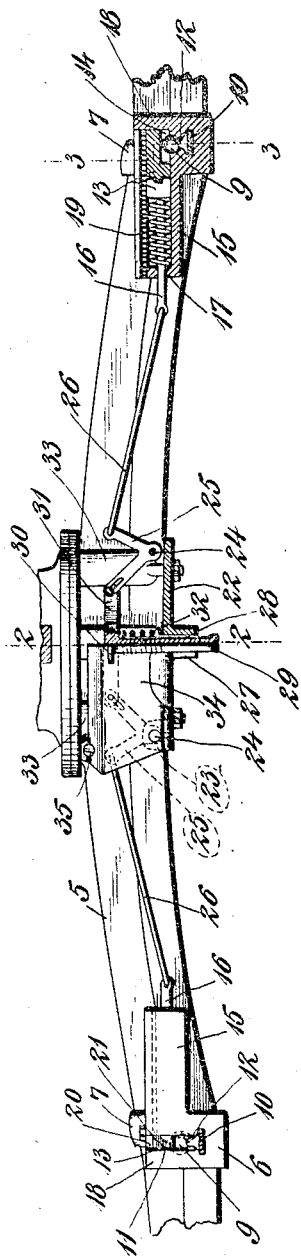
George A. Stiles.
Inventor
Witnesses
By
Attorneys

UNITED STATES PATENT OFFICE.

GEORGE ABRAM STILES, OF VERTREES, KENTUCKY.

THILL-COUPLING.

No. 892,694.  Specification of Letters Patent.  Patented July 7, 1908.

Application filed January 20, 1908. Serial No. 411,660.

*To all whom it may concern:*

Be it known that I, GEORGE ABRAM STILES, a citizen of the United States, residing at Vertrees, in the county of Hardin and State of Kentucky, have invented certain new and useful Improvements in Thill-Couplings, of which the following is a specification.

This invention relates to thill-couplings, and has for its object to provide a device of this kind whereby the thills or shafts of a vehicle may be attached or released by simply pressing a lever with the foot.

The invention also aims to produce an antirattling thill-coupling, and one which is simple in construction, and which can be attached to any ordinary vehicle.

In the accompanying drawing, Figure 1 is a front elevation of a vehicle axle, showing the application of the invention, parts being shown in section. Fig. 2 is a vertical section on the line 2—2 of Fig. 1, and Fig. 3 is a vertical section on the line 3—3 of Fig. 1.

In the drawing, 5 denotes the front axle of a vehicle. The thill-coupling comprises a box or casing 6 which is formed integrally with the front branch of a clip 7 embracing the axle and secured thereto in the usual manner. In the box is a seat 8 for the ball-shaped head 9 of the shaft-iron 10, and in the front wall of the box, and communicating with the seat 8, is a vertical slot 11 through which the shaft-iron passes to the outside of the box and which permits the shaft to swing in a vertical plane. That portion of the shaft-iron which works in the slot is reduced in width, as indicated at 12, and the width of the slot is less than the diameter of the ball 9 so that the ball cannot be withdrawn through the slot. The slot extends to the top of the box, and the latter is open on top.

Inside the box is mounted a transversely sliding latch 13 engageable with the top of the ball 9 for holding the same to its seat. In the end of the latch is a recess 14 in which the ball fits. The latch is mounted in a lateral extension 15 of the box 6, and has at its end opposite the recess 14 a stem 16 passing through the end wall 17 of the extension 15. The recessed end of the latch abuts against the outer wall 18 of the box 6. Around the stem 16, on the inside of the extension, between the end wall 17 and the latch, is coiled a spring 19 for normally holding the latch in engagement with the ball 9. The latch extends over the ball, as clearly shown in Figs. 1 and 3, and upon withdrawing the latch the ball can be removed from the box through the open top thereof, the part 12 of the shaft-iron passing up the slot 11.

To the top of the latch 13 is secured a slide 20 having tongues 21 in its longitudinal edges which fit in corresponding grooves in the front and rear walls of the box 6 and its extension 15, on the inside thereof. This slide closes the top of the box and the extension when the latch is in locking position, and thereby prevents entry of dust, etc. thereinto.

A coupling device as herein described, is provided for each thill or shaft, and the stems 16 of said couplings are connected to a device to be presently described whereby both coupling members may be operated simultaneously to attach or detach the thills.

To the bottom of the axle at or about the middle thereof, is attached a plate 22 which projects in front of the axle and has ears 23 at its front edge to which are pivoted by means of bolts 24 bell-cranks 25, one of the arms of which is connected respectively, by means of rods 26 to the stem 16. On the bottom of the projecting portion of the plate 22 is a boss 27 and an opening 28, in which is mounted a vertically movable plunger 29 having attached to its lower end a foot-piece 30, and provided at its upper end with oppositely extending horizontal branches 31 connected, respectively, to the bell-cranks 25. The branches 31 are slotted, and the arms of the bell-cranks which are connected to the branches extend between the slots thereof. Between the top of the projecting portion of the plate 22 and the branches 31 a spring 32 is coiled around the plunger 29 for the purpose of normally holding the same elevated. Upon pressing down on the foot-piece 30, the plunger is depresesd, and by reason of its connection with the bell-cranks, and the connections between the latter and the latches 13, the latter will be withdrawn from the balls 9 and the thills can then be removed, as hereinbefore described. Upon removing the foot from the piece 30, the springs 32 and 19 restore the parts to their normal position.

The plate 22 is fastened to the axle by the clips 33 which secure the fifth-wheel to the axle. The bell-cranks 25 and the plunger 29 are protected by a plate 34 secured at its lower end to the ears 23 by the bolts 24. The upper end of the plate can be fastened to the axle by screws 35, or if the axle is of metal, the upper edge of the plate can be slipped under the clips 33.

By the arrangement of parts herein described a thill-coupling is had which is easily operated to attach and detach the thills. No specially constructed axle is required and the coupling can be readily applied. Its parts are few and simple and therefore not liable to get out of order. The plunger 29 has a shoulder 36 which is drawn tightly against the boss 27 by the spring 32 thereby preventing rattling of the parts.

I claim:—

1. The combination with a thill-coupling, each member of which has a latch, of means for operating the latches simultaneously, said means comprising a support secured to the axle, a plunger mounted in said support and having a shoulder and laterally presented branches, bell-cranks connected to the latches and the branches, and a spring coiled around the plunger between its support and the branches for holding the shoulder in engagement with the support.

2. A thill-coupling comprising a box open on top and having a seat for the head of the thill-iron, and a slot communicating with the seat through which the shank of the thill-iron extends, a casing on one side of the box, a latch slidably mounted in said casing and engageable across the top of the aforesaid head a cover for the casing connected to and movable with the latch, and means for operating the latch.

In testimony whereof I affix my signature, in presence of two witnesses.

GEORGE ABRAM STILES.

Witnesses.
M. U. CRALLE,
J. C. MARTIN.